United States Patent
Kim et al.

(10) Patent No.: US 7,211,962 B2
(45) Date of Patent: May 1, 2007

(54) PLANAR LIGHT SOURCE DEVICE, METHOD OF DRIVING THE SAME AND DISPLAY APPARATUS HAVING THE SAME

(75) Inventors: Joong-Hyun Kim, Yongin-si (KR); In-Sun Hwang, Suwon-si (KR); Hae-Il Park, Seoul (KR); Jin-Seob Byun, Seoul (KR); Hyoung-Joo Kim, Uiwang-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/037,576

(22) Filed: Jan. 18, 2005

(65) Prior Publication Data

US 2005/0156532 A1    Jul. 21, 2005

(30) Foreign Application Priority Data

Jan. 17, 2004  (KR)  ...................... 10-2004-0003541

(51) Int. Cl.
    *G09G 3/28* (2006.01)
(52) U.S. Cl. ...................... 315/169.3; 313/491; 345/55
(58) Field of Classification Search ............. 315/169.3, 315/169.4; 313/491, 495; 345/55
    See application file for complete search history.

(56) References Cited

U.S. PATENT DOCUMENTS

| 5,329,203 | A  | * | 7/1994  | Jeong ......................... 313/491 |
| 2005/0110414 | A1 | * | 5/2005  | Cho et al. .................... 313/634 |
| 2005/0248509 | A1 | * | 11/2005 | Hashimoto et al. ........... 345/63 |

FOREIGN PATENT DOCUMENTS

JP    04002037 A  *  1/1992

* cited by examiner

*Primary Examiner*—David Vu
(74) *Attorney, Agent, or Firm*—Cantor Colburn LLP (57) ABSTRACT

A light source device includes a light emitting body, a pair of main electrodes and a pair of sub electrodes. The light emitting body includes discharge spaces disposed substantially parallel to each other. The main electrodes are disposed at opposite end portions of the light emitting body, respectively. The main electrodes induce an electrical discharge of a gas in the discharge spaces between the main electrodes. The sub electrodes are disposed between the main electrodes. The sub electrodes induce an electrical discharge of a gas in the discharge spaces between the sub electrodes. Resultantly, power consumption is reduced and uniformity of luminance is enhanced. Therefore, display quality of the display apparatus is enhanced.

21 Claims, 10 Drawing Sheets

PLANAR LIGHT SOURCE DEVICE, METHOD OF DRIVING THE SAME AND DISPLAY APPARATUS HAVING THE SAME

BACKGROUND OF THE INVENTION

1. Field of the Invention

The present invention relates to an image display device and a light source device for providing light to display images. More particularly, the present invention relates to a planar light source device, a method of driving the planar light source device and a display apparatus having the planar light source device.

2. Description of the Related Art

Liquid crystal display (LCD) apparatuses display images using liquid crystal. When electric fields are applied to the liquid crystal, an arrangement of liquid crystal molecules is changed to adjust optical transmittance of the liquid crystal to display images. An LCD apparatus generally includes a liquid crystal control module that controls the arrangement of the liquid crystal molecules and a light-providing module that provides the liquid crystal control module with light.

The liquid crystal control module includes a first substrate and a second substrate, a first electrode and a second electrode disposed at the first and second substrates, respectively, and a liquid crystal layer interposed between the first and second substrates. The light-providing module includes a light source that generates light and an optical member that enhances optical characteristics of the light.

Quality of images displayed by the liquid crystal control module is influenced by quality of light generated by the light-providing module. A conventional LCD apparatus employs a light emitting diode (LED) that emits point-light or a cold cathode fluorescent lamp (CCFL) that emits linear light. The LED and the CCFL have a low uniformity of luminance. Therefore, the conventional LCD apparatus employs the optical member such as a diffusion sheet, a prism sheet, etc., in order to enhance the uniformity of luminance.

Recently, there has been a desire to increase screen size of the LCD apparatus. To accommodate the desire to increase screen size, generally, the number of light sources used increases. Increasing the number of light sources tends to increase the size and weight of the LCD apparatus. To reduce the number of light sources and thereby minimize size and weight of the LCD apparatus, a planar light source device has been developed.

The planar light source device has a rectangular-shape. The planar light source device includes discharge spaces spaced apart from each other. Invisible light is generated by a working gas in the discharge spaces, and the invisible light is transformed into a visible light by a fluorescent material coated on an inner surface of the planar light source device.

The planar light source device may also have non-uniform luminance depending on an arrangement and/or configuration of the discharge spaces. When luminance of each discharge space is not uniform, the quality of images displayed by the LCD apparatus is deteriorated. Thus, there has been research to improve the uniformity of the luminance of each discharge space.

SUMMARY OF THE INVENTION

An exemplary embodiment of the present invention provides a planar light source device having a uniform luminance and a low power consumption. Another exemplary embodiment of the present invention also provides a method of driving the above-mentioned planar light source device. Still another exemplary embodiment of the present invention also provides a display apparatus having the above-mentioned planar light source device.

In an exemplary embodiment of the light source device according to the present invention, the light source device includes a light emitting body, main electrodes and sub electrodes. The light emitting body includes discharge spaces disposed substantially parallel to each other. The main electrodes are disposed at opposite end portions of the light emitting body. The main electrodes induce an electrical discharge of a gas in the discharge spaces between the main electrodes. The sub electrodes are disposed between the main electrodes. The sub electrodes induce an electrical discharge of a gas in the discharge spaces between the sub electrodes.

In another exemplary light source device according to the present invention, the light source device includes a light emitting body, main electrodes, sub electrodes and a voltage controller. The light emitting body includes discharge spaces disposed in a first direction substantially parallel to each other. The main electrodes are respectively disposed at opposite end portions of the light emitting body. The main electrodes provide a potential difference between opposite end portions of each discharge space. The sub electrodes are disposed between the main electrodes. The sub electrodes provide a potential difference between selected regions of each discharge space. The voltage controller controls main and sub driving voltages applied to the main electrodes and sub electrodes, respectively.

In an exemplary method of driving the light source device according to the present invention, a sub driving voltage is applied to the sub electrodes to induce an electrical discharge of a working gas in the discharge spaces between the sub electrodes. Then, a main driving voltage is applied to the main electrodes to induce an electrical discharge of the working gas in the discharge spaces between the main electrodes.

In an exemplary embodiment according to the present invention, the display apparatus includes a light source device, a liquid crystal display panel and a receiving container. The light source device includes a light emitting body that includes discharge spaces, main electrodes and sub electrodes. The discharge spaces are disposed in a first direction substantially parallel to each other. The main electrodes are respectively disposed at opposite end portions of the light emitting body. The sub electrodes are disposed between the main electrodes. The liquid crystal display panel displays images using light generated by the light source device. The receiving container receives the light source device and the liquid crystal display panel.

According to the present invention, electrical discharge is induced two times. That is, the working gas disposed at center portion of the planar light source device is electrically discharged first, and then the working gas of the entire planar light source device is electrically discharged. As a result, power consumption is reduced and uniformity of luminance is enhanced. Therefore, display quality of the display apparatus is improved.

This application relies for priority upon Korean Patent Application No. 2004-3541 filed on Jan. 17, 2004, the contents of which are herein incorporated by reference in its entirety.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Hereinafter, the embodiments of the present invention will be described in detail with reference to the accompanied drawings.

Embodiment 1

Figure 1:
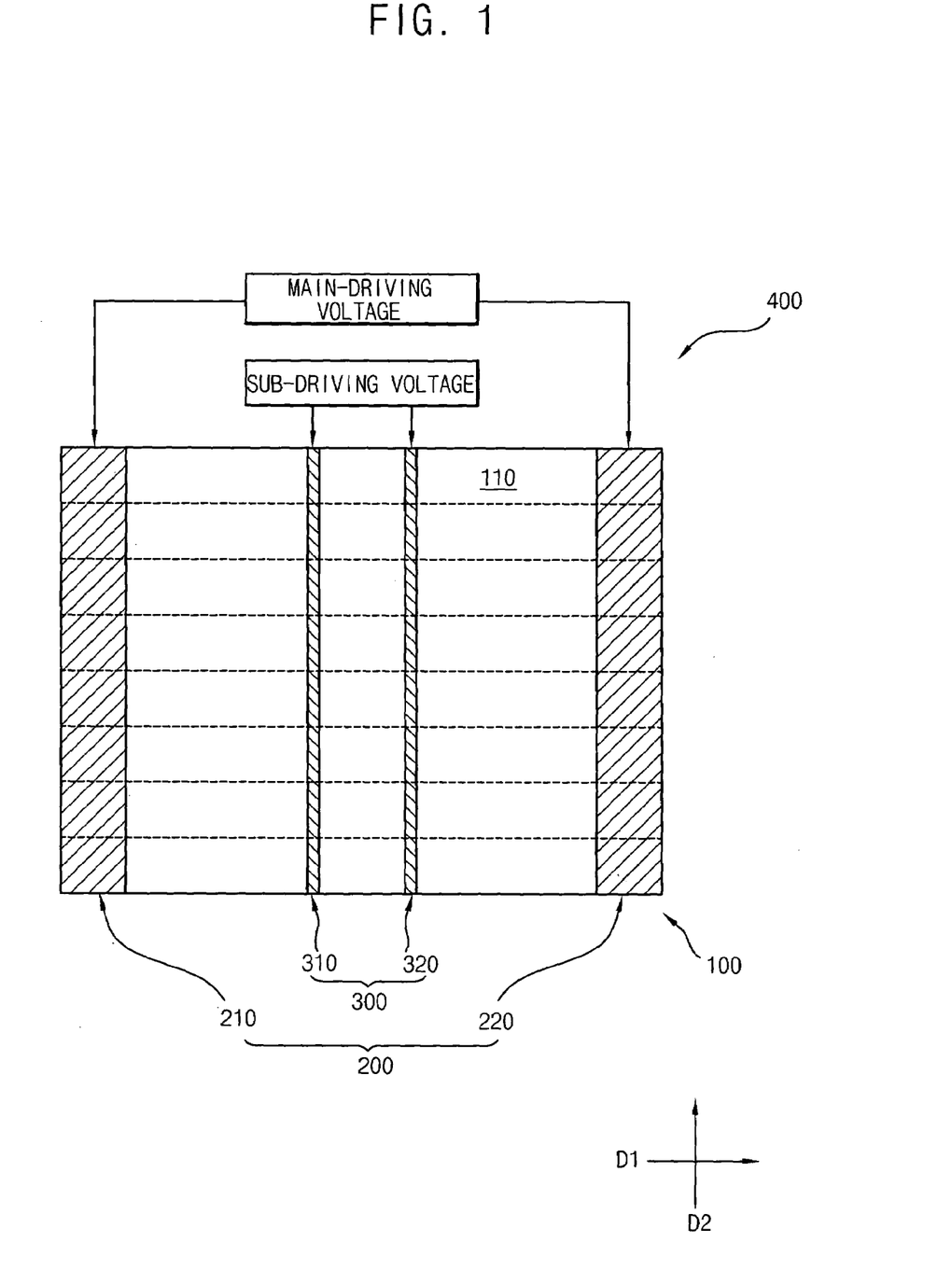
FIG. 1 is a schematic plan view illustrating a backside of a planar light source device according to an exemplary embodiment of the present invention.

FIG. 1 is a schematic plan view illustrating a backside of a planar light source device according to an exemplary embodiment of the present invention. Referring to FIG. 1, a planar light source device 400 according to a present embodiment includes a light emitting body 100, a pair of main electrodes 200 and a pair of sub electrodes 300. Although the present embodiment shows a single pair of main and sub electrodes 200 and 300, it will be appreciated by one skilled in the art, that more than a single pair of main and sub electrodes 200 and 300 may be employed.

The light emitting body 100 includes discharge spaces 110. The light emitting body 100 also includes a first face and a second face. Light generated from the discharge spaces 110 exits the light emitting body 100 through the first face. The second face is disposed opposite to the first face and is substantially parallel to the first face. Each discharge space 110 is extended along a first direction D1. The discharge spaces 110 are arranged along a second direction D2 that is substantially perpendicular to the first direction D1. The discharge spaces 110 are substantially parallel with each other and, for example, connected to each other.

The main electrodes 200 include a first main electrode 210 and a second main electrode 220. The first and second main electrodes 210 and 220 are disposed substantially parallel to each other at a first end portion and a second end portion of the light emitting body 100, respectively. The first and second main electrodes 210 and 220 are spaced apart from each other. In this embodiment, the first and second main electrode 210 and 220 are disposed substantially equidistant from a centerline of the light emitting body 100. The centerline of the light emitting body 100 extends in the second direction D2 and is substantially parallel to the first and second main electrodes. The first and second main electrodes 210 and 220 are extended along the second direction D2 so that the first and second main electrodes 210 and 220 are in electrical communication with each discharge space 110. In this embodiment, the first and second main electrodes 210 and 220 are disposed at the second face of the light emitting body 100.

The sub electrodes 300 include a first sub electrode 310 and a second sub electrode 320. The first and second sub electrodes 310 and 320 are disposed between the first and second main electrodes 210 and 220. The first and second sub electrodes 310 and 320 are disposed substantially parallel to both each other and the first and second main electrodes 210 and 220. The first and second sub electrodes 310 and 320 are disposed at the second face of the light emitting body 100. The first and second sub electrodes 310 and 320 are spaced apart from each other. The first and second sub electrodes 310 and 320 are extended along the second direction D2 so that the first and second sub electrodes 310 and 320 are in electrical communication with each discharge space 110. A distance between the first main electrode 210 and the first sub electrode 310 may be substantially equal to a distance between the second main electrode 220 and the second sub electrode 320. Alternatively, the distance between the first main electrode 210 and the first sub electrode 310 may be different from the distance between the second main electrode 220 and the second sub electrode 320. In other words, a distance between the first sub electrode 310 and the centerline may be same as a distance between the second sub electrode 320 and the centerline, or the distance between the first sub electrode 310 and the centerline may be different than the distance between the second sub electrode 320 and the centerline. In the present embodiment, the distance between the first sub electrode 310 and the centerline is substantially equal to the distance between the second sub electrode 320 and the centerline.

When a working gas in the discharge spaces 110 is electrically discharged, light and heat are generated from the working gas. However, the amount of heat generated by electrically discharging the working gas is smaller than the amount of heat generated by a conventional light source. Since, the planar light source device 400 has a lower amount of heat generation than a conventional light source, the planar light source 400 is desirable for use in an LCD apparatus.

In order to induce an electrical discharge of the working gas in the discharge spaces 110 of the light emitting body 100, a main driving voltage is applied to the first and second main electrodes 210 and 220. The main driving voltage applied to the first and second main electrodes 210 and 220 has a first potential difference that is sufficient for inducing an electrical discharge of the working gas disposed between the first and second main electrodes 210 and 220.

In order to start electrically discharging the working gas in the discharge spaces 110 of the light emitting body 100, a sub-driving voltage is applied to the first and second sub electrodes 310 and 320 before the main driving voltage is applied to the first and second main electrodes 210 and 220. The sub driving voltage applied to the first and second sub electrodes 310 and 320 has a second potential difference that is sufficient for inducing an electrical discharge of the working gas disposed between the first and second sub electrodes 310 and 320.

A distance between the first and second sub electrodes 310 and 320 is smaller than a distance between the first and second main electrodes 210 and 220. Therefore, the second potential difference between the first and second sub electrodes 310 and 320 may be smaller than the first potential difference between the first and second main electrodes 210 and 220 and still induce the electrical discharge of the working gas between the first and second sub electrodes 310 and 320. In other words, a voltage level of the first sub electrode 310 is lower than a voltage level of the first main electrode 210.

When the sub driving voltage is applied to the first and second sub electrodes 310 and 320, the working gas disposed between the first and second sub electrodes 310 and 320 is electrically discharged first, for a predetermined time. after the predetermined time, the main driving voltage is applied to the first and second main electrodes 210 and 220 and the sub driving voltage is no longer applied. The main driving voltage induces an electrical discharge in the working gas in the discharge spaces 110 between the first and second main electrodes 210 and 220.

The first and second main electrodes 210 and 220 may be disposed in the light emitting body 100. Alternatively, the first and second main electrodes 210 and 220 may be disposed at an outer face of the light emitting body 100. In an exemplary embodiment, the first and second main electrodes 210 and 220 are disposed on the second face of the light emitting body 100.

The first and second sub electrodes 310 and 320 may be disposed in the light emitting body 100. Alternatively, the first and second sub electrodes 310 and 320 may be disposed at the outer face of the light emitting body 100. In an exemplary embodiment, the first and second sub electrodes 310 and 320 are disposed on the second face of the light emitting body 100.

Thus, when the distance between the first and second sub electrodes 310 and 320 is smaller than the distance between the first and second main electrodes 210 and 220, a discharge start voltage is reduced.

The planar light source device 400 further includes the working gas and a fluorescent layer. The working gas is introduced into the discharge spaces 110 of the planar light source device 400. The working gas includes, for example, mercury (Hg), argon (Ar), neon (Ne), xenon (Xe), krypton (Kr), etc. When electrons collide with, for example, the mercury atoms, ultraviolet light is generated. Use of argon (Ar), neon (Ne), xenon (Xe), krypton (Kr), etc. for the working gas, lowers the voltage necessary to induce the electrical discharge due to penning effect.

The fluorescent layer is formed on an inner face of the light emitting body 100. In other words, the fluorescent layer is disposed in contact with the discharge spaces 110. The fluorescent layer converts the ultraviolet light into visible light.

Embodiment 2

Figure 2:
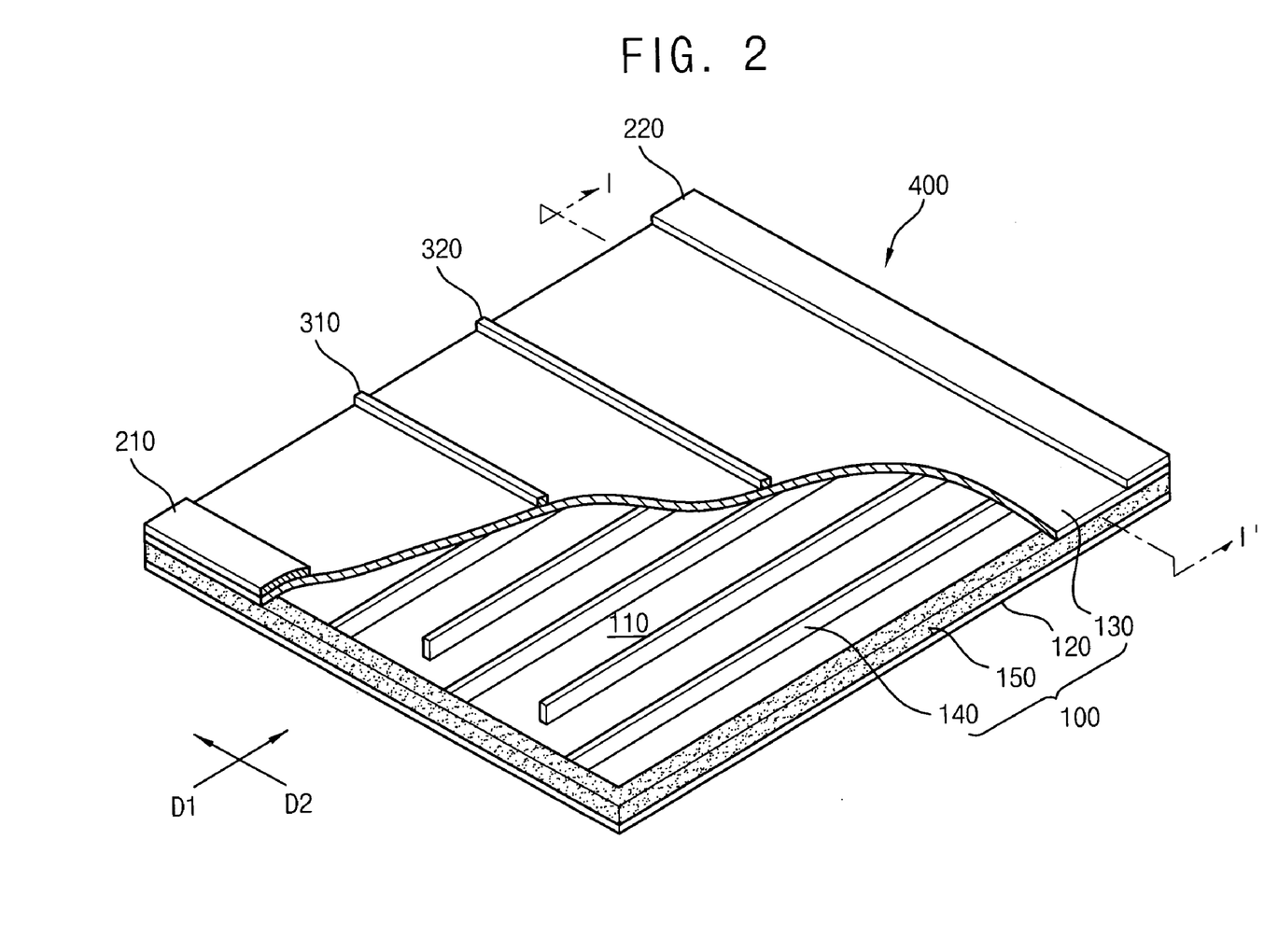
FIG. 2 is a partially cut out perspective view illustrating the backside of the planar light source device according to another exemplary embodiment of the present invention.
Figure 3:
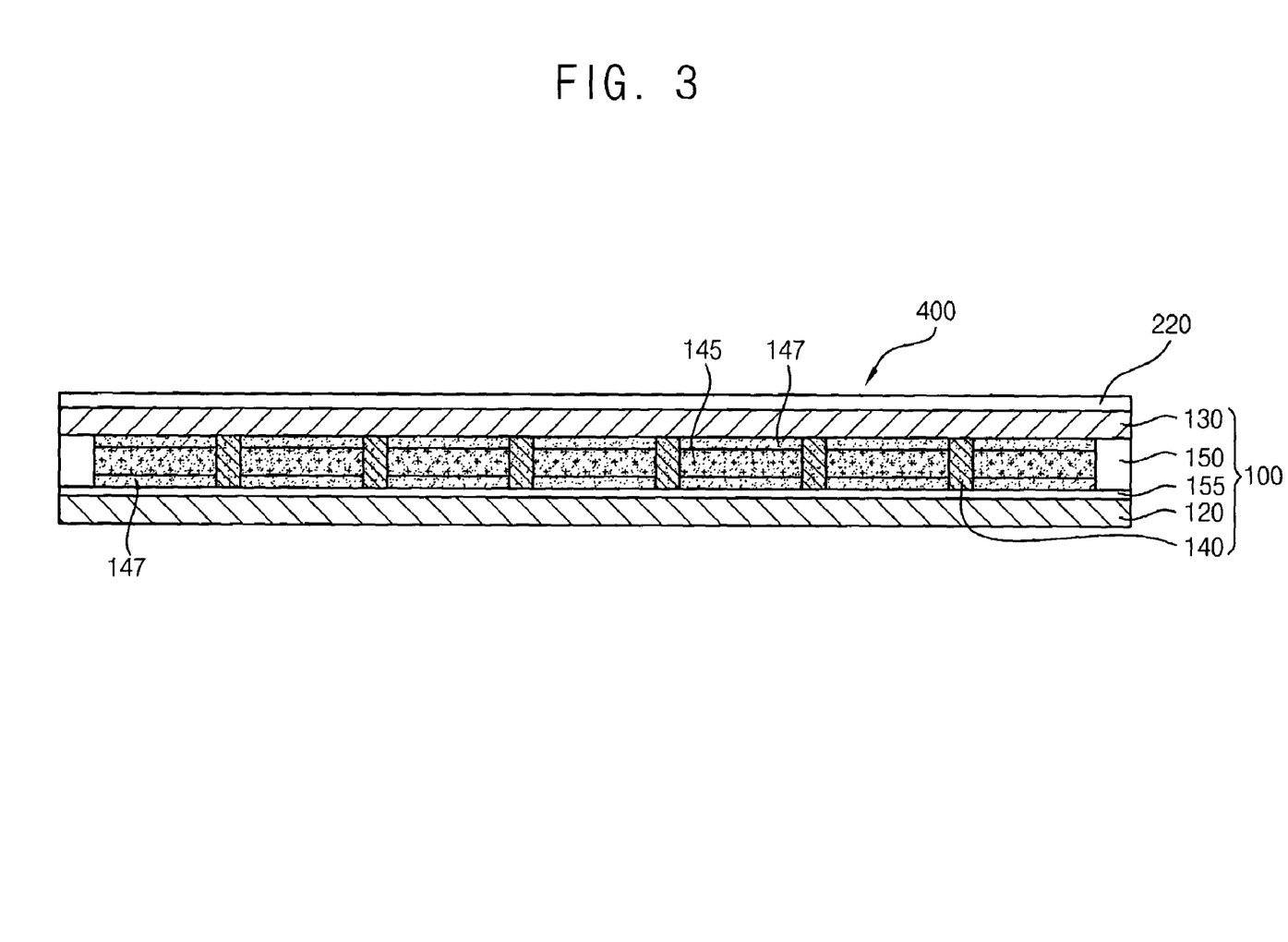
FIG. 3 is a cross-sectional view taken along line I–I' in FIG. 2.

FIG. 2 is a partially cut out perspective view illustrating the backside of the planar light source device 400 according to another exemplary embodiment of the present invention, and FIG. 3 is a cross-sectional view taken along a line I–I' in FIG. 2.

The planar light source device 400 according to the present embodiment is same as in Embodiment 1 except for the light emitting body 100. Thus, the same reference numerals will be used to refer to the same or like parts as those described in Embodiment 1 and any further explanation will be omitted.

Referring to FIGS. 2 and 3, the light emitting body 100 includes a first substrate 120, a second substrate 130, a partition member 140, a sealing member 150 and a light-reflecting layer 155.

The first and second substrates 120 and 130 are disposed parallel to each other and face each other. The first substrate 120 has a plate-shape and may include a glass substrate that may transmit light. Alternatively, the first substrate 120 may include a material that blocks light. In another embodiment, the first substrate 120 may include resin having lower optical transmittance than that of the glass substrate. The light-reflecting layer 155 is formed on a surface of the first substrate 120 such that the light-reflecting layer 155 faces the second substrate 130. The light-reflecting layer 155 reflects light toward the second substrate 130 to enhance a luminance of the light exiting the light emitting body 100. The second substrate 130 having a plate-shape, may include a glass substrate which transmits light.

The light emitting body 100 further includes a fluorescent layer 147. The fluorescent layer 147 is formed, for example, on surfaces of the first and second substrates 120 and 130 such that the fluorescent layer 147 formed on the first substrate 120 faces the fluorescent layer 147 formed on the second substrate 130. The fluorescent layer 147 converts ultraviolet light into visible light.

The sealing member 150 is interposed between the first and second substrates 120 and 130. The sealing member 150 is formed along edge portions of the first and second substrates 120 and 130 to define a space between the first and second substrates 120 and 130.

The partition member 140 is interposed between the first and second substrates 120 and 130. In this embodiment, the light emitting body 100 includes multiple partition members 140. The partition members 140 are disposed in the space defined by the sealing member 150 and the first and second substrates 120 and 130. Each partition member 140 has a first end and a second end and is extended in the first direction D1. Each partition member 140 has a rod-shape, a cross-section of which has, for example, a rectangular-shape. Each partition member 140 has a length along the first direction D1, and a width along the second direction D2. The length of each partition member 140 is larger than the width thereof. The first direction D1 is substantially perpendicular to the second direction D2. The partition members 140 are disposed such that a longitudinal direction of the partition members 140 is substantially parallel to the first direction D1. Thus, in this embodiment, the partition members 140 are parallel to each other.

When the partition members 140 are disposed between the first and second substrates 120 and 130, the space between the first and second substrates 120 and 130 is divided into the discharge spaces 110 extended along the first direction D1 and substantially parallel to each other.

The light emitting body 100 further includes working gas 145 introduced into the discharge spaces 110. When a pressure of the working gas 145 is non-uniform throughout the discharge spaces 110, the luminance of the light emitting body 100 becomes non-uniform throughout the discharge spaces 110. To prevent non-uniform luminance, the discharge spaces 110 are connected to each other to substantially equalize the pressure of each discharge space 110.

For example, if the partition members 140 are numbered sequentially while proceeding in the second direction D2, first ends of odd numbered partition members 140 make contact with the sealing member 150, and second ends of even numbered partition members 140 make contact with the sealing member 150. Therefore, the discharge spaces 110 are connected to each other to form a serpentine-shape. Other methods of connecting the discharge spaces 110 are also contemplated, for example, the partition members 140 may include a hole connecting the discharge spaces 110.

When the discharge spaces 110 are connected to each other, plasma generated may flow into neighboring discharge spaces 110 to induce non-uniformity of luminance. However, plasma generated between the first and second sub electrodes 310 and 320 may not flow into neighboring discharge spaces 110 due to the partition members 140 and the non-uniformity of luminance is prevented. Additionally, the discharge start voltage may be decreased due to a decreased distance between the first and second sub electrodes 310 and 320.

Embodiment 3

Figure 4:
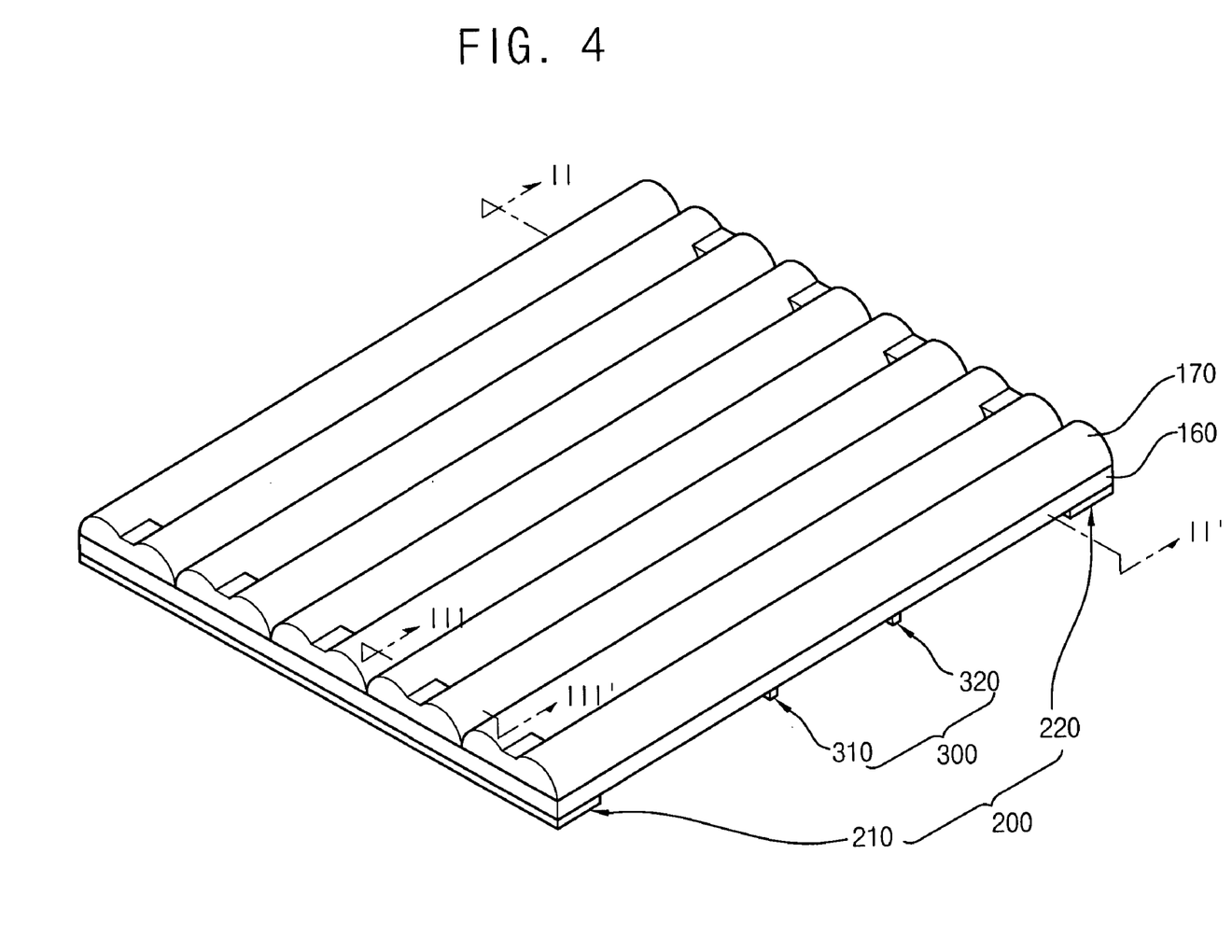
FIG. 4 is a perspective view illustrating a planar light source device according to still another exemplary embodiment of the present invention.
Figure 5A:
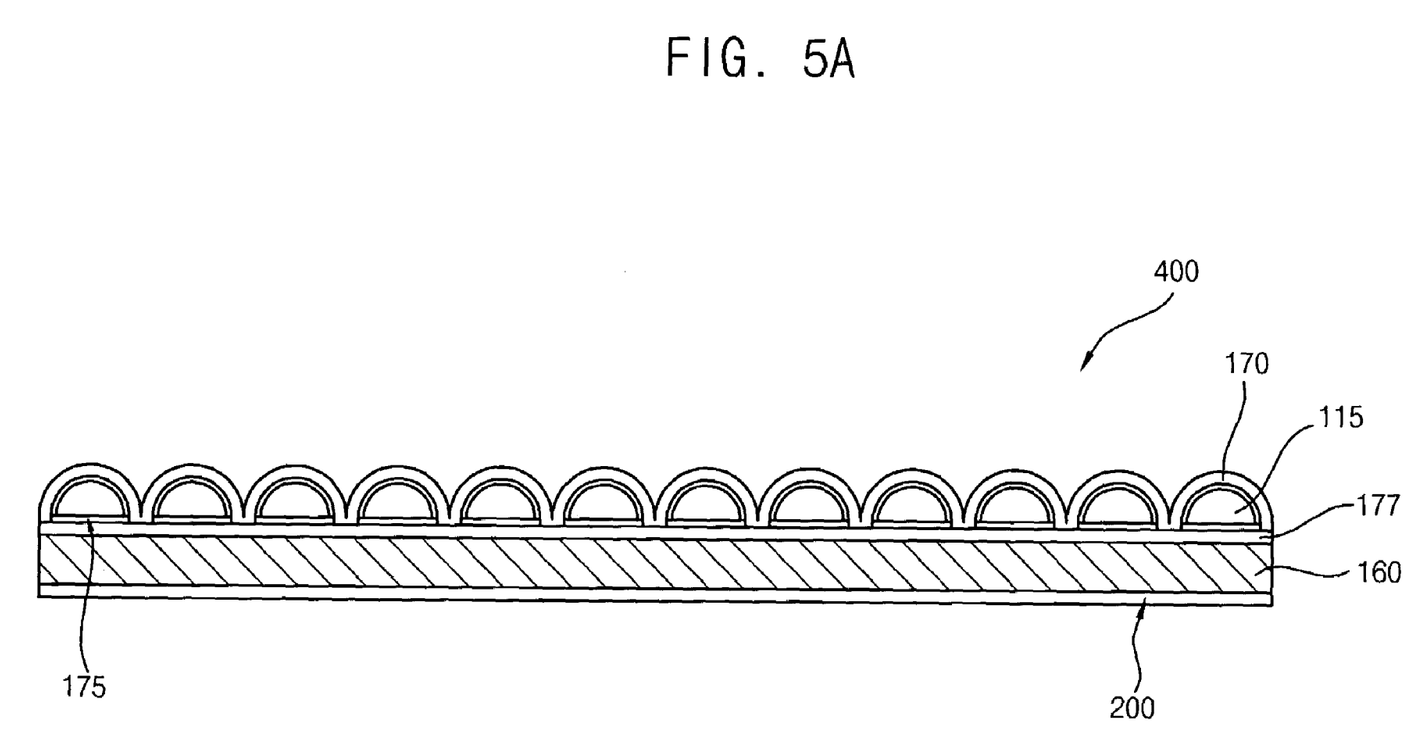
FIG. 5A is a cross-sectional view of the planar light source device taken along line II–II' in FIG. 4.
Figure 5B:
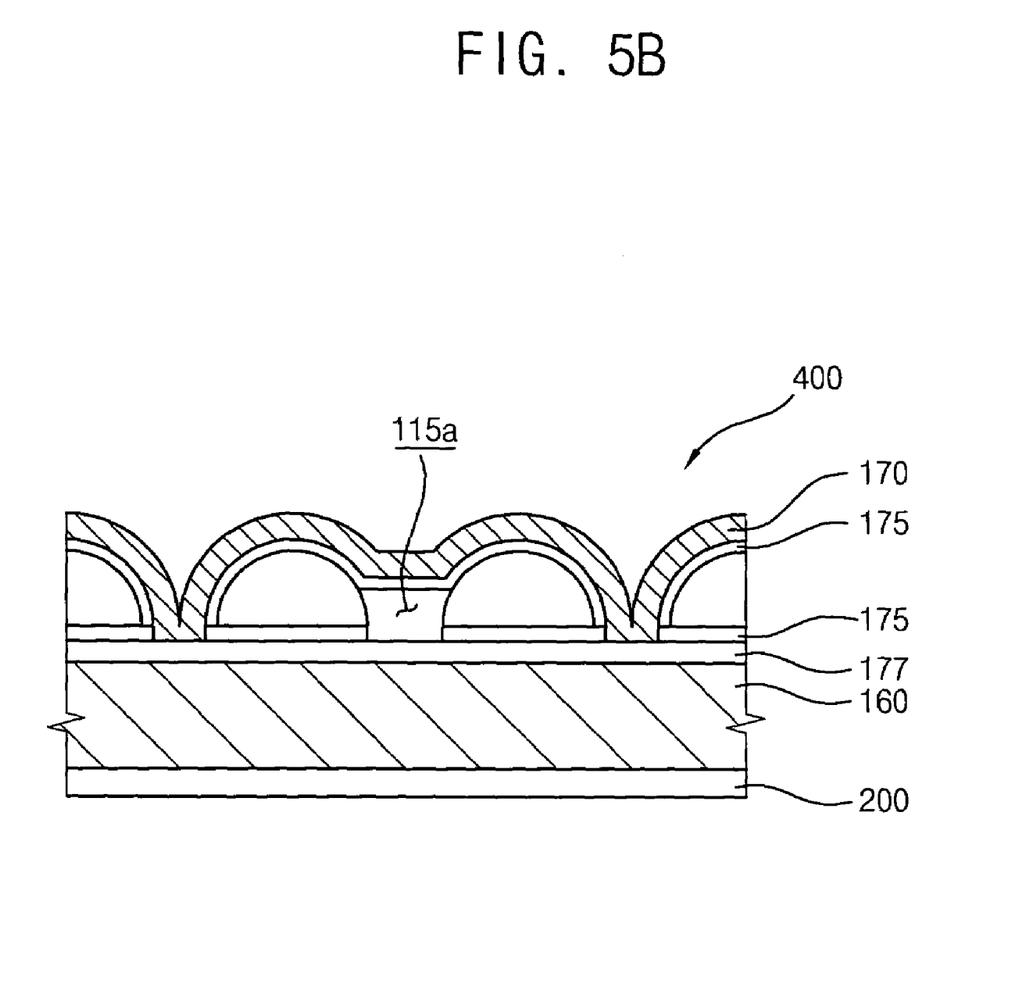
FIG. 5B is a cross-sectional view of the planar light source device taken along line III–III' in FIG. 4.

FIG. 4 is a perspective view illustrating the planar light source device 400 according to still another exemplary embodiment of the present invention. FIG. 5A is a cross-sectional view taken along a line II–II' in FIG. 4, and FIG. 5B is a cross-sectional view taken along a line III–III' in FIG. 4. The planar light source device 400 according to the present embodiment is same as in Embodiment 1 except for the light emitting body. Thus, the same reference numerals will be used to refer to the same or like parts as those described in Embodiment 1 and any further explanation will be omitted.

Referring to FIGS. 4, 5A and 5B, the light emitting body includes a first substrate 160, a second substrate 170, a fluorescent layer 175 and a light-reflecting layer 177.

The first substrate 160 having a plate-shape may transmit light. For example, a glass substrate may be used as the first substrate 160. The second substrate 170 includes furrows extended along a longitudinal direction of the second substrate 170. Therefore, a cross-section of the second substrate 170 includes, for example, arches. Alternatively, the cross-section of the second substrate 170 may include a rounded trapezoidal-shape.

When the first and second substrates 160 and 170 are combined with each other, discharge spaces 115 are formed between the first and second substrates 160 and 170. The furrows define sidewalls of the discharge spaces 115. A sealing member (not shown) such as glass including lead (Pb) combines the first and second substrates 160 and 170. The discharge spaces 115 are connected to one another to form the serpentine-shape to substantially equalize a pressure of each discharge space.

An opening portion 115a connects the adjacent discharge spaces 115. The opening portion 115a is disposed at an end portion of the furrows. In an exemplary embodiment, the opening portions 115a are disposed alternating between a first end portion and a second end portion of sequential furrows, so that the discharge spaces 115 are connected to one another to form the serpentine-shape.

The light-reflecting layer 177 is formed on a surface of the first substrate 160 such that the light-reflecting layer 177 faces the second substrate 170. A fluorescent layer 175 is formed on inner face of the second substrate 170, which faces the first substrate 160. The fluorescent layer 175 may also be formed on the light-reflecting layer 177. Discharge spaces 115 having a shape of arches or the rounded trapezoidal-shape cause light generated from the working gas of the discharge spaces 115 to be emitted radially, which enhances uniformity of luminance.

Embodiment 4

Figure 6:
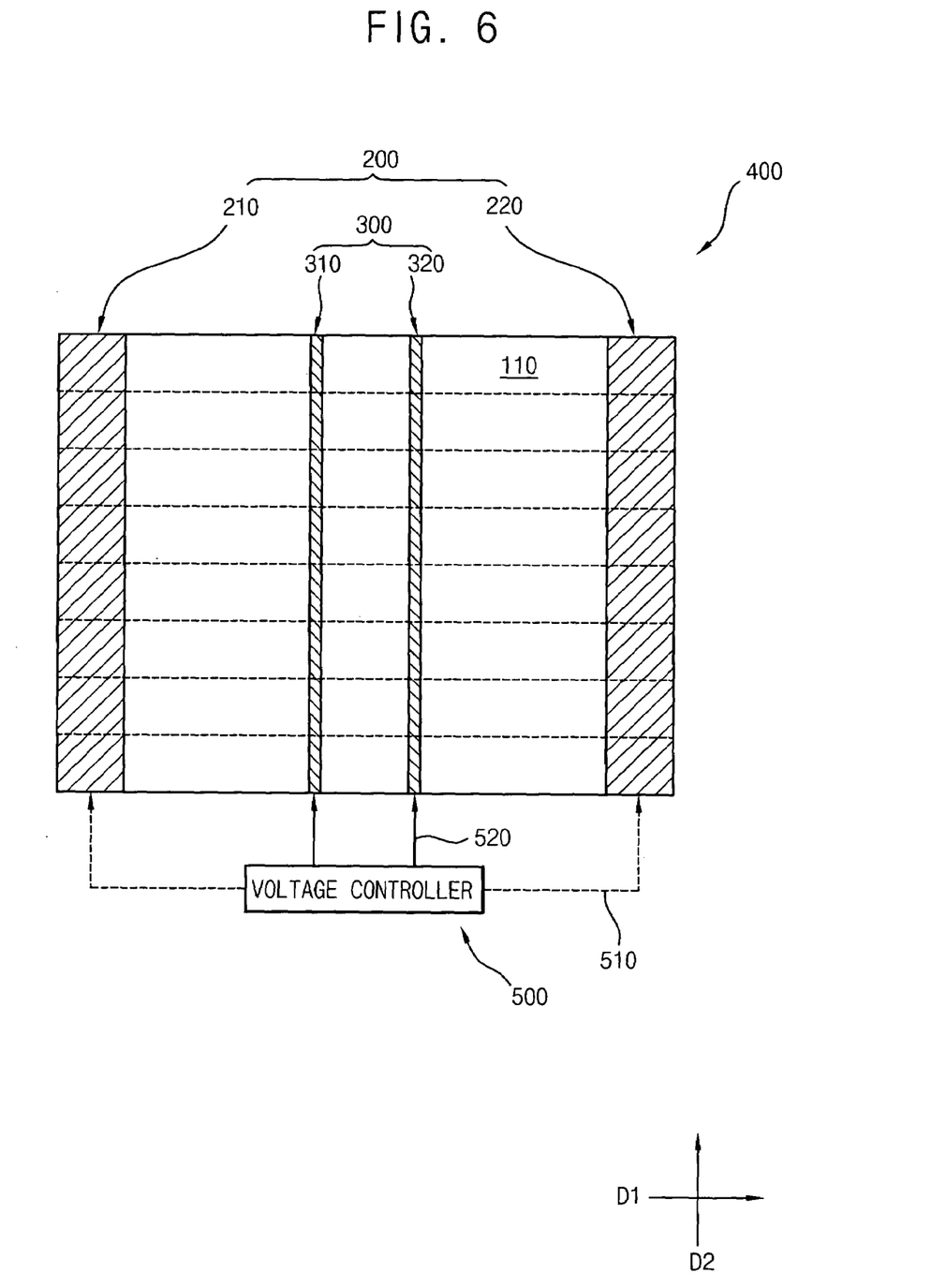
FIG. 6 is a schematic plan view illustrating a backside of a planar light source device according to still another exemplary embodiment of the present invention.

FIG. 6 is a schematic plan view illustrating a backside of the planar light source device 400 according to still another exemplary embodiment of the present invention. The planar light source device 400 according to the present embodiment is same as in Embodiment 1 except for a voltage controller 500. Thus, the same reference numerals will be used to refer to the same or like parts as those described in Embodiment 1 and any further explanation will be omitted.

Referring to FIG. 6, the planar light source device 400 further includes the voltage controller 500. The voltage controller 500 generates a main driving voltage 510 and a sub driving voltage 520. The main driving voltage 510 is applied to first and second main electrodes 210 and 220. The sub driving voltage 520 is applied to first and second sub electrodes 310 and 320.

The main driving voltage 510 applied to the first and second main electrodes 210 and 220 has a first potential difference that is sufficient for inducing an electrical discharge of the working gas disposed between the first and second main electrodes 210 and 220. The sub driving voltage 520 applied to the first and second sub electrodes 310 and 320 has a second potential difference that is sufficient for inducing an electrical discharge of the working gas disposed between the first and second sub electrodes 310 and 320.

The first potential difference is greater than the second potential difference, and the first potential difference is smaller than a potential difference needed for a conventional planar light source device which has no extra electrodes like the first and second sub electrodes 310 and 320.

The voltage controller 500 applies the sub driving voltage 520 to the first and second sub electrodes 310 and 320 for a predetermined time period and then breaks circuit so that the sub driving voltage 520 is no longer applied to the first and second sub electrodes 310 and 320. After the predetermined time, the voltage controller applies the main driving voltage 510 to the first and second main electrodes 210 and 220.

Embodiment 5

Figure 7:
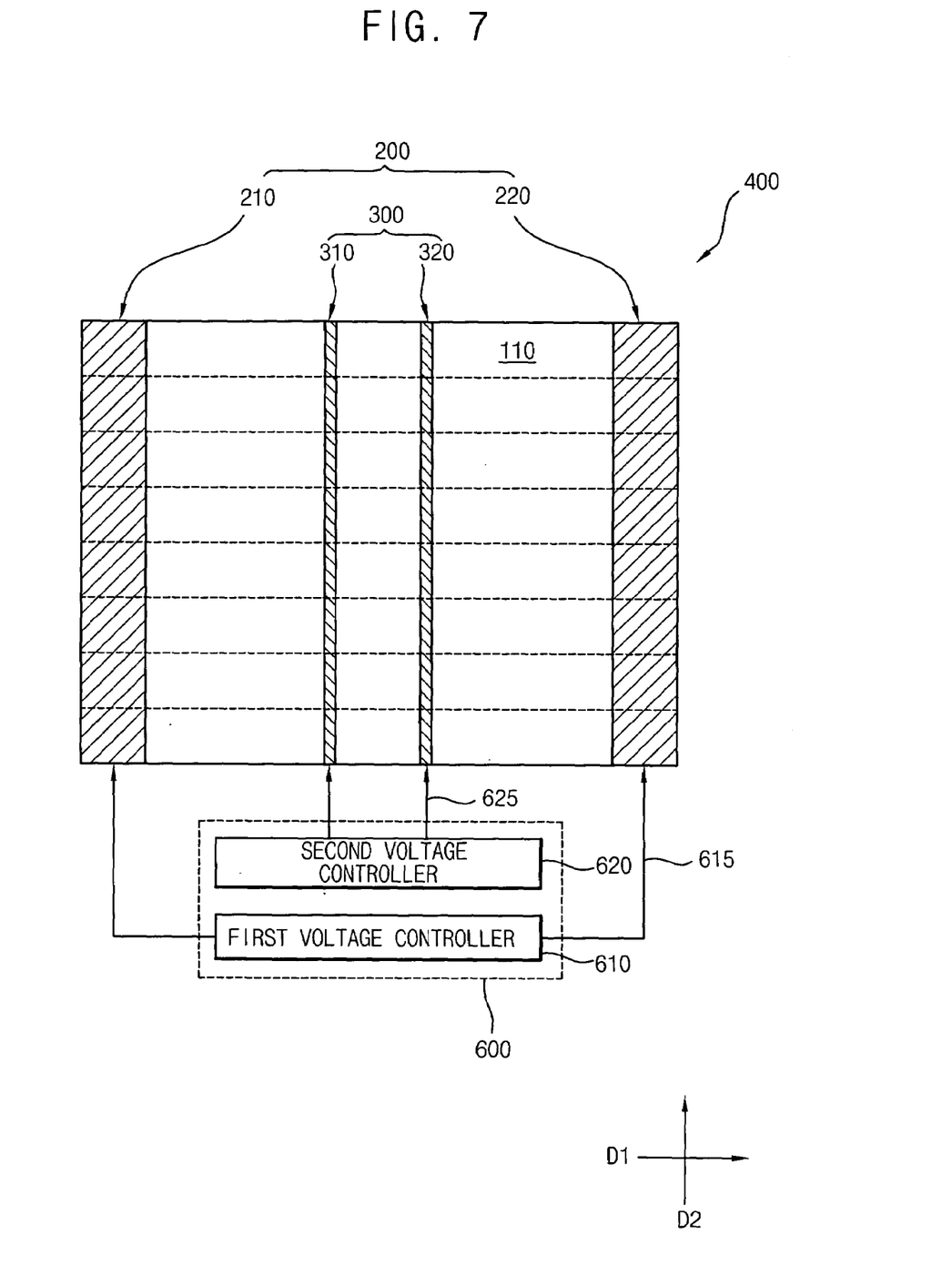
FIG. 7 is a schematic plan view illustrating a backside of a planar light source device according to still another exemplary embodiment of the present invention.

FIG. 7 is a schematic plan view illustrating a backside of the planar light source device 400 according to still another exemplary embodiment of the present invention. The planar light source device 400 according to the present embodiment is same as in Embodiment 1 except for a voltage controller 600. Thus, the same reference numerals will be used to refer to the same or like parts as those described in Embodiment 1 and any further explanation will be omitted.

Referring to FIG. 7, a planar light source device 400 further includes the voltage controller 600. The voltage controller 600 includes a first voltage control device 610 and a second voltage control device 620.

The first voltage control device 610 applies a main driving voltage 615 to first and second main electrodes 210 and 220. The main driving voltage 615 applied to the first and second main electrodes 210 and 220 has a first potential difference that is sufficient for inducing an electrical discharge of the working gas disposed between the first and second main electrodes 210 and 220.

The second voltage control device 620 applies a sub driving voltage 625 to first and second sub electrodes 310 and 320 for a predetermined time period and then breaks circuit so the sub driving voltage 625 is no longer applied to the first and second sub electrodes 310 and 320.

The sub driving voltage 625 applied to the first and second sub electrodes 310 and 320 has a second potential difference that is sufficient for inducing an electrical discharge of the working gas disposed between the first and second sub electrodes 310 and 320.

The first potential difference is greater than the second potential difference, and the first potential difference is smaller than the potential difference needed for the conventional planar light source device which has no electrode like the first and second sub electrodes 310 and 320.

Figure 8:
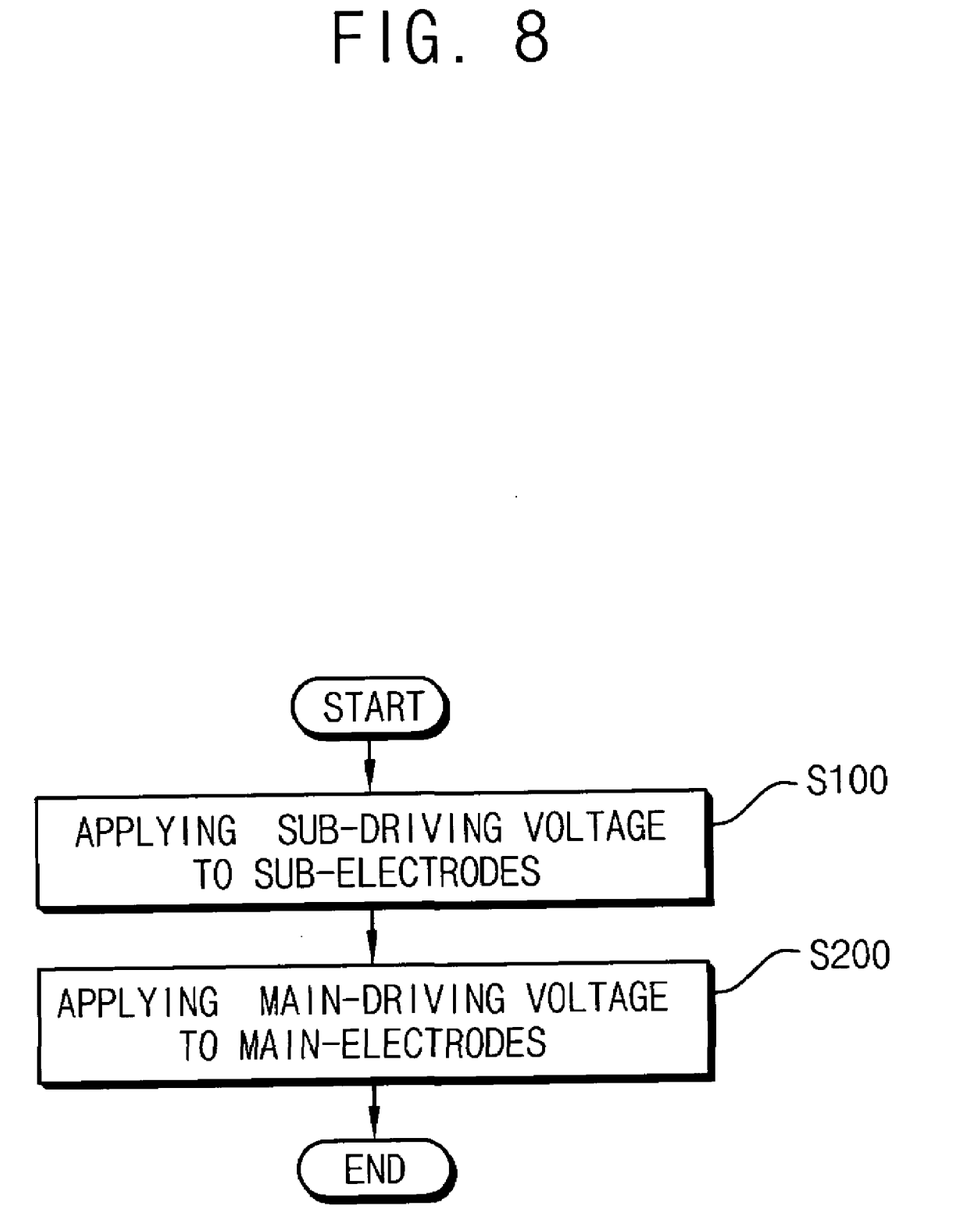
FIG. 8 is a flow chart illustrating a method of driving a planar light source device according to an exemplary embodiment of the present invention.

FIG. 8 is a flow chart illustrating a method of driving the planar light source device according to an exemplary embodiment of the present invention. The planar light source device of the present embodiment may be same as in one of the previous embodiments. For convenience of explanation, the planar light source device 400 of Embodiment 1 is employed.

Referring to FIGS. 1 and 8, the sub-driving voltage is applied to first and second sub electrodes 310 and 320 for a predetermined time period (step S100).

When the sub driving voltage is applied to the first and second sub electrodes 310 and 320, the working gas between the first and second sub electrodes 310 and 320 is electrically discharged to generate plasma, which subsequently generates light.

Then, the main driving voltage is applied to the first and second main electrodes 210 and 220, and the sub driving voltage is no longer applied to the first and second sub electrodes 310 and 320 (step S200). After the predetermined time, the working gas between the first and second main electrodes 210 and 220 is electrically discharged.

The sub driving voltage that is applied to the first and second sub electrodes 310 and 320 is smaller than the main driving voltage, since less potential difference is required to induce an electrical discharge of the working gas between the first and second sub electrodes 310 and 320 than is required to induce an electrical discharge of the working gas between the first and second main electrodes 210 and 220. Thus, power consumption of the planar light source device 400 is reduced. Furthermore, plasma generated between the first and second sub electrodes 310 and 320 may not flow into neighboring discharge spaces. Therefore, uniformity of luminance is enhanced.

A potential difference between the first and second sub electrodes 310 and 320 is, for example, in a range of about 1.0 kV to about 1.5 kV, and a potential difference between the first and second main electrodes 210 and 220 is, for example, in a range of about 1.5 kV to about 1.9 kV.

Figure 9:
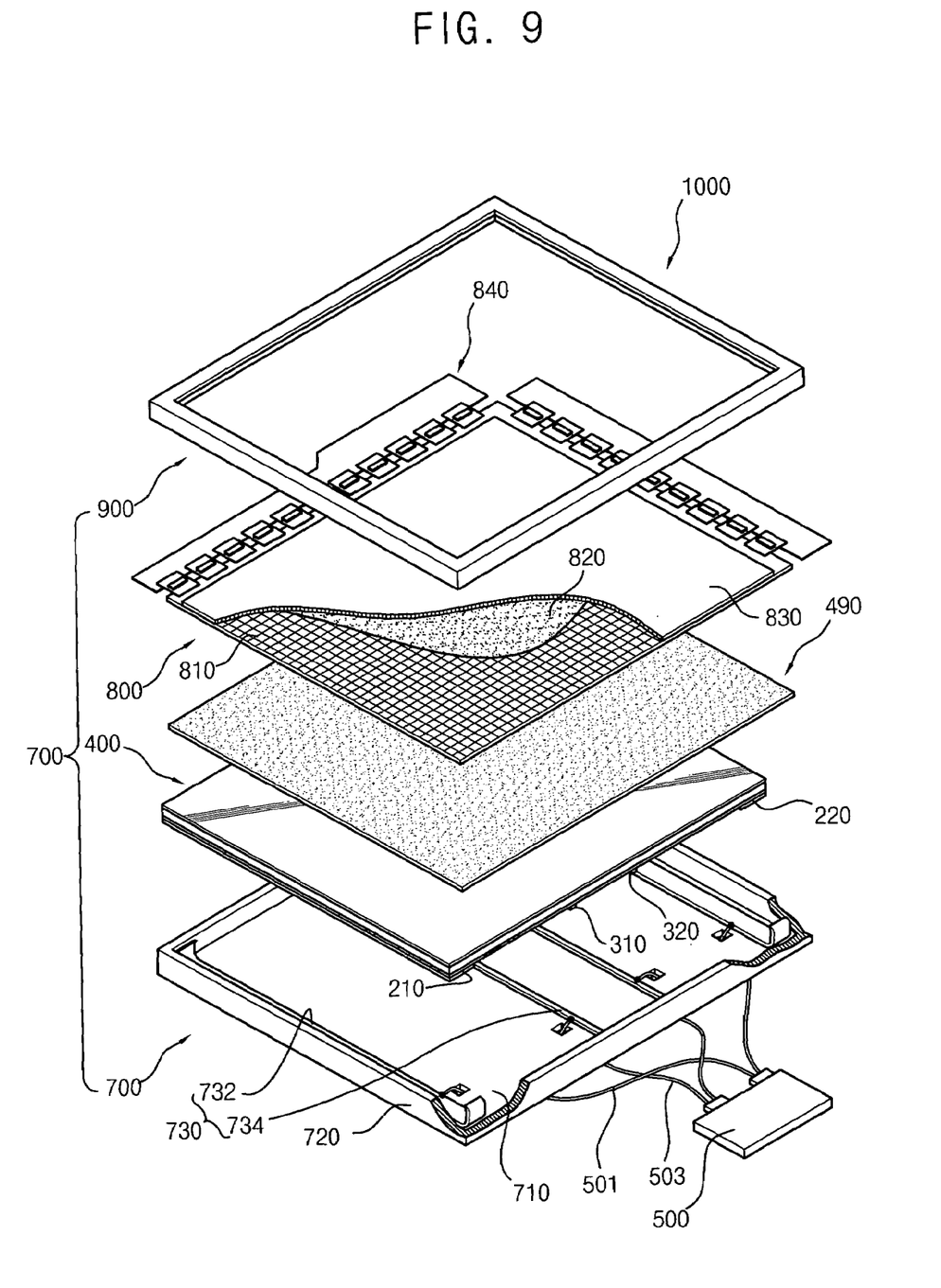
FIG. 9 is an exploded and partially cutout perspective view illustrating a display apparatus according to an exemplary embodiment of the present invention.

FIG. 9 is an exploded and partially cutout perspective view illustrating a display apparatus 1000 according to an exemplary embodiment of the present invention. The display apparatus 1000 may employ one of the embodiments of the planar light source device 400 described above. The display apparatus 1000 may employ, for example, the planar light source device 400 of Embodiment 1. Therefore, any further explanation about the planar light source device 400 will be omitted.

Referring to FIG. 9, a display apparatus 1000 includes a receiving container 700, a planar light source device 400, a liquid crystal display panel 800 and a chassis 900.

The receiving container 700 includes a bottom plate 710, a sidewall 720 upwardly extended from edge portions of the bottom plate 710, a discharge voltage applying module 730 and an inverter 500. The receiving container 700 supports the planar light source device 400 and the liquid crystal display panel 800.

The bottom plate 710 has sufficient area for supporting the planar light source device 400 and has substantially a same shape as the planar light source device 400. The bottom plate 710 has, for example, a rectangular shape. The sidewall 720 is extended upwardly from edge portions of the bottom plate 710. The planar light source device 400 may be fastened to the sidewall 720.

The discharge voltage-applying module 730 applies the main driving voltage to the first and second main electrodes 210 and 220, and the sub driving voltage to the first and second sub electrodes 310 and 320. The discharge voltage-applying module 730 includes a main driving voltage applying module 732 and a sub driving voltage applying module 734.

The first and second main electrodes 210 and 220 of the planar light source device 400 are electrically connected to the main driving voltage applying module 732 disposed at opposite end portions of the receiving container 700 corresponding to the first and second main electrodes 210 and 220. The first and second sub electrodes 310 and 320 of the planar light source device 400 are electrically connected to the sub driving voltage applying module 734 disposed at center portions of the receiving container 700 corresponding to the first and second sub electrodes 310 and 320.

The inverter 500 applies the main driving voltage to the main driving voltage applying module 732, and the sub driving voltage to the sub driving voltage applying module 734. The inverter 500 is electrically connected to the main driving voltage applying module 732 through a first wire 501, and the inverter 500 is electrically connected to the sub driving voltage applying module 734 through a second wire 503.

The liquid crystal display panel 800 displays images using the light generated from the planar light source device 400. The liquid crystal display panel 800 includes a thin film transistor (TFT) substrate 810, a liquid crystal layer 820, a color filter substrate 830 and a driver module 840.

The TFT substrate 810 includes pixel electrodes, thin film transistors, gate lines and data lines. The pixel electrodes are arranged in a matrix shape. Each of the pixel electrodes is electrically connected to one of the thin film transistors. Each of the gate lines is substantially perpendicular to each of the data lines.

The color filter substrate 830 includes color filters and a common electrode. Each of the color filters faces one of the pixel electrodes. The common electrode is formed on the color filters. The liquid crystal layer 820 is interposed between the TFT substrate 810 and the color filter substrate 830.

The chassis 900 surrounds edge portions of the color filter substrate 830, and the chassis 900 is combined with the receiving container 700 by means of a hook. The chassis 900 protects the liquid crystal display panel 800 and prevents separation of the liquid crystal display panel 800 from the planar light source device 400. The display apparatus 1000 may further include optical members 490 that enhance optical properties of light generated from the planar light source device 400.

According to the present invention, electrical discharge is induced two times. First, the working gas disposed at center portion of the planar light source device is electrically discharged for a predetermined time. Then, the working gas of the entire planar light source device 400 is electrically discharged. As a result, power consumption is reduced and uniformity of luminance is enhanced. Therefore, display quality of the display apparatus 1000 is enhanced.

Having described the exemplary embodiments of the present invention and its advantages, it is noted that various changes, substitutions and alterations can be made herein without departing from the spirit and scope of the invention as defined by appended claims.

What is claimed is:

1. A light source device comprising:
a light emitting body including discharge spaces extended in a first direction;
main electrodes disposed at opposite end portions of the light emitting body, respectively, the main electrodes disposed in a second direction substantially perpendicular to the first direction, the main electrodes inducing an electrical discharge of a gas in the discharge spaces between the main electrodes; and sub electrodes disposed between the main electrodes, the sub electrodes disposed in a direction substantially parallel to the second direction, the sub electrodes inducing an electrical discharge of a gas in the discharge spaces between the sub electrodes.

2. The light source device of claim 1, wherein a main driving voltage is applied to the main electrodes and a sub driving voltage is applied to the sub electrodes.

3. The light source device of claim 2, wherein the sub driving voltage is lower than the main driving voltage.

4. The light source device of claim 1, wherein the main electrodes are disposed at an outer surface of the light emitting body.

5. The light source device of claim 1, wherein the sub electrodes are disposed at an outer surface of the light emitting body.

6. The light source device of claim 1, wherein the main and sub electrodes are disposed at an outer surface of the light emitting body.

7. The light source device of claim 1, wherein the light emitting body comprises a fluorescent layer formed on an inner surface of the light emitting body to convert an invisible light generated by the gas into a visible light.

8. The light source device of claim 1, wherein the light emitting body comprises:
a first substrate;
a second substrate disposed substantially parallel to and facing the first substrate;
at least one partition member disposed between the first and second substrates in the first direction to divide a space between the first and second substrates into the discharge spaces; and
a sealing member disposed between the first and second substrates and along edges of the first and second substrates to combine with the first and second substrates to define the space between the first and second substrates.

9. The light source device of claim 8, wherein the discharge spaces are connected to one another.

10. The light source device of claim 1, wherein the light emitting body comprises:
a first substrate having a plate shape; and
a second substrate combined with the first substrate, the second substrate having furrows to define the discharge spaces between the first and second substrates, the furrows defining the sidewalls of the discharge spaces.

11. The light source device of claim 1, wherein the sub electrodes include first and second sub electrodes which are disposed at first and second regions spaced apart from a centerline of the light emitting body by a first distance and a second distance, respectively, in opposite directions, the centerline being an imaginary line extended in a direction substantially perpendicular to a longitudinal direction of the discharge spaces.

12. The light source device of claim 11, wherein the first distance is substantially equal to the second distance.

13. The light source device of claim 11, wherein the first and second distances are different from each other.

14. A light source device comprising:
a light emitting body including discharge spaces disposed in a first direction;
main electrodes disposed at opposite end portions of the light emitting body, respectively, the main electrodes disposed in a second direction substantially perpendicular to the first direction, the main electrodes providing a potential difference between opposite end portions of each discharge space;
sub electrodes disposed between the main electrodes, the sub electrodes disposed in the second direction substantially perpendicular to the first direction, the sub electrodes providing a potential difference between selected regions of each discharge space; and
a voltage controller that controls a main driving voltage and a sub driving voltage applied to the main electrodes and the sub electrodes, respectively.

15. The light source device of claim 14, wherein for a predetermined time the voltage controller applies the sub driving voltage to the sub electrodes, and after the predetermined time the voltage controller applies the main driving voltage to the main electrodes and stops applying the sub driving voltage to the sub electrodes.

16. The light source device of claim 14, wherein the voltage controller comprises a first voltage control device applying the main driving voltage to the main electrodes and a second voltage control device applying the sub driving voltage to the sub electrodes.

17. The light source device of claim 16, wherein the second voltage control device stops applying the sub driving voltage to the sub electrodes when the first voltage control device starts applying the main driving voltage to the main electrodes.

18. A method of driving a light source device including a light emitting body having discharge spaces disposed in a first direction, main electrodes disposed in a second direction substantially perpendicular to the first direction at opposite end portions of the light emitting body, respectively, and sub electrodes disposed in the second direction substantially perpendicular to the first direction between the main electrodes, the method comprising:
applying a sub driving voltage to the sub electrodes to induce an electrical discharge of a working gas in the discharge spaces between the sub electrodes during a predetermined time period; and
applying a main driving voltage to the main electrodes to induce an electrical discharge of the working gas in the discharge spaces between the main electrodes after the predetermined time period.

19. The method of claim 18, wherein the sub driving voltage is in a range of about 1.0 kV to about 1.5 kV, and the main driving voltage is in a range of about 1.5 kV to about 1.9 kV.

20. The method of claim 18, further comprising stopping the applying of the sub driving voltage to the sub electrodes when applying the main driving voltage to the main electrodes.

21. A display apparatus comprising:
a light source device including a light emitting body having discharge spaces disposed in a first direction, main electrodes disposed in a second direction substantially perpendicular to the first direction at opposite end portions of the light emitting body, respectively, and sub electrodes disposed in a second direction substantially perpendicular to the first direction between the main electrodes;
a liquid crystal display panel that displays images using a light generated by the light source device; and
a receiving container that receives the light source device and the liquid crystal display panel.

* * * * *